United States Patent
Savant (10) Patent No.: US 8,646,072 B1
(45) Date of Patent: Feb. 4, 2014

(54) DETECTING MISUSE OF TRUSTED SEALS

(75) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 273 days.

(21) Appl. No.: 13/022,986

(22) Filed: Feb. 8, 2011

(51) Int. Cl.
*G06F 12/16* (2006.01)
*G06F 15/16* (2006.01)

(52) U.S. Cl.
USPC .......................................... 726/22; 709/229

(58) Field of Classification Search
USPC ..................................... 713/201; 726/22–25
See application file for complete search history.

(56) References Cited

U.S. PATENT DOCUMENTS

| | | | | |
|---|---|---|---|---|
| 5,836,502 | A * | 11/1998 | Kanai et al. | 227/131 |
| 6,615,404 | B1 * | 9/2003 | Garfunkel et al. | 717/173 |
| 6,782,480 | B2 * | 8/2004 | Mirov | 713/300 |
| 7,398,366 | B2 * | 7/2008 | Ohran et al. | 711/162 |
| 7,698,442 | B1 * | 4/2010 | Krishnamurthy et al. | 709/229 |
| 2006/0218411 | A1 * | 9/2006 | Lutnaes | 713/193 |
| 2007/0083919 | A1 * | 4/2007 | Heffez | 726/5 |
| 2008/0046738 | A1 * | 2/2008 | Galloway et al. | 713/176 |
| 2008/0079817 | A1 * | 4/2008 | Murata et al. | 348/222.1 |
| 2008/0086603 | A1 * | 4/2008 | Lahtinen et al. | 711/147 |
| 2008/0232769 | A1 * | 9/2008 | Jureczki et al. | 386/94 |
| 2009/0083421 | A1 * | 3/2009 | Glommen et al. | 709/224 |
| 2009/0138729 | A1 * | 5/2009 | Hashimoto et al. | 713/193 |
| 2010/0083353 | A1 * | 4/2010 | Wang | 726/5 |
| 2010/0153672 | A1 * | 6/2010 | Jogand-Coulomb et al. | 711/164 |
| 2010/0192196 | A1 * | 7/2010 | Lee | 726/1 |
| 2011/0119293 | A1 * | 5/2011 | Taylor et al. | 707/769 |

OTHER PUBLICATIONS

"Fake Seals and Phony Numbers: How Fraudsters Try to Look Legit," U.S. Securities and Exchange Commission, Last Modified Dec. 2, 2009, 3 pages, [Online] Retrieved from the Internet<URL:http://www.sec.gov/investor/pubs/fakeseals.htm>.
"Verisign: Unable to Validate This Seal," Verisign™, May 12, 2011, 1 page, [Online] Retrieved from the Internet<URL:https://trustsealinfo.verisign.com/splash?form_file=fdf/splash.fdf&dn=<website&lang=en>.
"Website Trust Seals—Which One is Right for You?" Squidoo, LLC, 2011, 7 pages, [Online] [Retrievedon Jun. 30, 2011] Retrieved from the Internet<URL:http://www.squidoo.com/siteseal>.
"What is SpoofStick?" SpoofStick Home, Dec. 8, 2005, 1 page, [Online] Retrieved from the Internet<URL:http://www.spoofstick.com/>.

* cited by examiner

*Primary Examiner* — Eleni Shiferaw
*Assistant Examiner* — Abu Sholeman
(74) *Attorney, Agent, or Firm* — Fenwick & West LLP (57) ABSTRACT

Misuse of a trusted seal by a website is detected. Web browsing activities at a client are monitored. Upon detecting a website visited by the client, the client requests evaluation of the website by a security server. The security server replies with a reputation score indicating whether the website is trustworthy. If the website is not trustworthy, perceptual hashes of selected images in the website are computed and compared with perceptual hashes of known trusted seals. If there is a match between the hash of a website image and the hash of a seal image, a query is made as to whether the website is authorized to use the trusted seal. If the website is not authorized to use the seal, the website is reported to be misusing the trusted seal.

19 Claims, 5 Drawing Sheets

DETECTING MISUSE OF TRUSTED SEALS

BACKGROUND OF THE INVENTION

1. Field of the Invention

This invention pertains in general to computer security and in particular to the detection of misuse of trusted seals by websites.

2. Description of the Related Art

Modern Internet users face a wide variety of threats. For example, innocent-looking websites can surreptitiously phish confidential information. Other websites can distribute malicious software (malware) such as computer viruses, worms, Trojan horse programs, spyware, adware, and crimeware. Some websites are not necessarily malicious, but use poor security protocols or take other actions that unreasonably expose users to Internet-based threats.

In order to help users distinguish safe and unsafe websites, known trusted parties issue security seals to websites that are certified as using appropriate security procedures. Two such trusted issuers are VERISIGN AUTHENTICATION SERVICES and THAWTE, both owned by Symantec Corp. After being certified, a website can display the trusted seal. The seal assures visitors that the website is trustworthy and can boost user confidence in the services provided by the website.

Because the trusted seals are displayed as images, some unethical websites misuse trusted seals by copying and displaying unauthorized seals. A website might also subtly alter the seal to avoid detection by the seal-issuing party. This misuse amounts to a false representation that a website displaying the seal is trustworthy, when in fact the website has not been certified by the seal issuer. As a result, a user can be misled into interacting with an untrustworthy website.

BRIEF SUMMARY

The above and other needs are met by methods, computer-readable storage media, and systems for detection of misuse of trusted seals by websites.

One aspect provides a computer-implemented method for detecting misuse of a trusted seal by a website. Embodiments of the method comprise comparing selected ones of multiple images of a website to images of trusted seals. Responsive to the comparison indicating that a selected image of the website matches an image of a trusted seal, the method verifies that the website is authorized to use the trusted seal. Responsive to the verification indicating that the website is not authorized to use the trusted seal, the method reports that the website is misusing the trusted seal.

Another aspect provides a non-transitory computer-readable storage medium storing executable computer program instructions for detecting misuse of a trusted seal by a website. The computer-readable storage medium stores computer program instructions for comparing selected ones of multiple images of a website to images of trusted seals. The computer-readable storage medium further stores computer program instructions for verifying that the website is authorized to use the trusted seal responsive to the comparison indicating that a selected image of the website matches an image of a trusted seal. The computer-readable storage medium further stores computer program instructions for reporting that the website is misusing the trusted seal responsive to the verification indicating that the website is not authorized to use the trusted seal.

Still another aspect provides a computer system for detecting misuse of a trusted seal by a website. The system comprises a non-transitory computer-readable storage medium storing executable computer program modules including an image hashing module, a website verification module and a reporting module. The image hashing module is for comparing selected ones of multiple images of a website to images of trusted seals. The website verification module is for verifying that the website is authorized to use the trusted seal responsive to the comparison indicating that a selected image of the website matches an image of a trusted seal. The reporting module is for reporting that the website is misusing the trusted seal responsive to the verification indicating that the website is not authorized to use the trusted seal.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
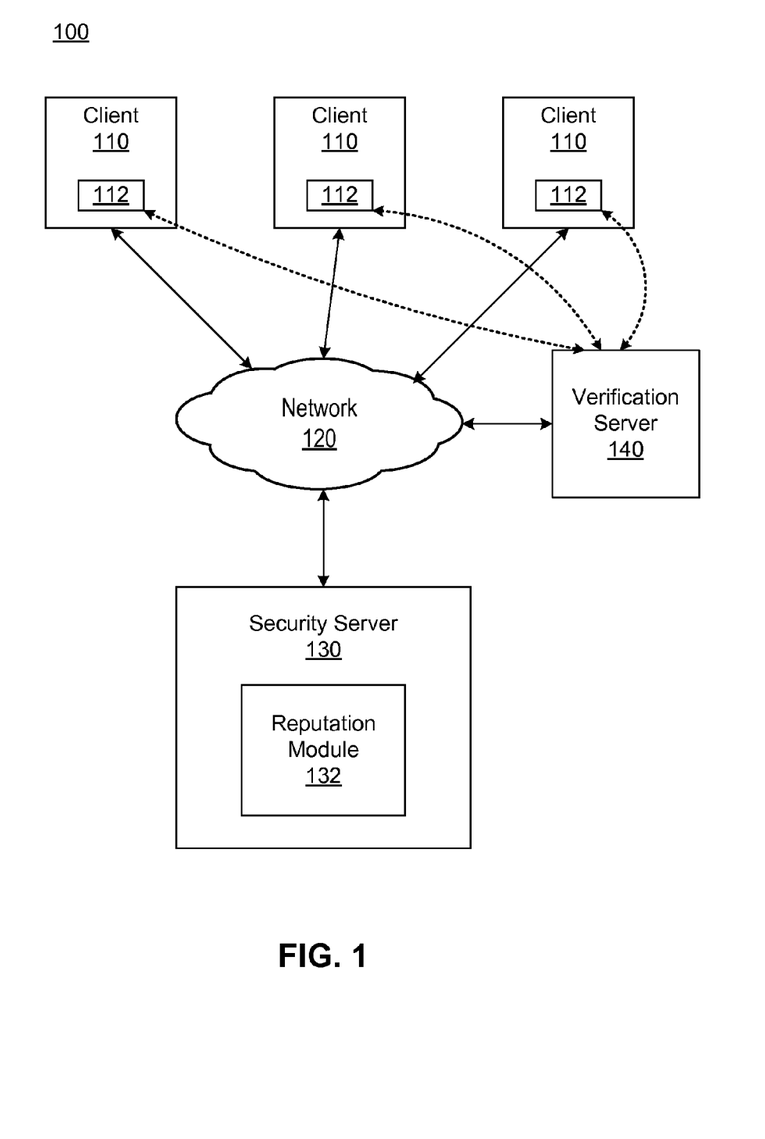
FIG. 1 is a high-level block diagram of a computing environment for detecting websites that misuse trusted seals.

FIG. 1 is a high-level block diagram of a computing environment 100 for detecting websites that misuse trusted seals according to one embodiment. FIG. 1 illustrates a security server 130, a verification server 140 and three clients 110 connected by a network 120. The illustrated environment 100 represents a typical computing environment where multiple clients 110 interact with the security server 130 and/or a verification server 140 to detect websites that misuse trusted seals. Only three clients 110 are shown in FIG. 1 in order to simplify and clarify the description. Embodiments of the computing environment 100 can have many clients 110, security servers 130 and/or verification servers 140 connected to the network 120.

The client 110 is used by a user to browse websites on the network 120, as well as to interact with the security server 130, the verification server 140 and/or other entities. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways.

The client 110 executes a security module 112 that detects websites that misuse trusted seals issued by trusted issuers. The security module 112 monitors websites visited by the client 110 and gets reputation information for the visited websites from the security server 130. If the reputation information indicates that the website is not trustworthy, the security module 112 examines the images on one or more web pages of the website to determine whether the images include a trusted seal. In one embodiment, the security module 112 compares perceptual hashes of website images with hashes of images of known trusted seals in order to detect any matches. If an image on the website matches a trusted seal issued by a known seal issuer, the security module 112 verifies with the seal issuer that the website is authorized to use the trusted seal. If the website contains an image of a trusted seal, but is not authorized to use the seal, the security module 112 reports to the user that the visited website is misusing the seal.

The security server 130 interacts with the clients 110 via the network 120. A reputation module 132 at the security server 130 collects reputation information from clients 110 and/or other sources for use in calculating reputations for websites, files, clients 110, and/or other entities on the network 120. For example, the security server 130 can maintain a list of websites which have misused trusted seals or have distributed malware in the past. In response to a request from a client 110 for the reputation of a website, the security server 130 responds to the request by providing the reputation of the requested website. Additionally, the security server 130 may provide other security services to the clients 110, such as providing malware definitions and detecting misuse of trusted seals by websites.

The verification server 140 is a computer that provides information indicating whether a website is authorized to use a trusted seal issued by the trusted seal issuer. In one embodiment, the verification server 140 is operated by the same trusted party that issues the seals. The verification server 140 receives a request from the client 110 or from the security server 140 to verify that a website is authorized to use a trusted seal, and replies with the result of the verification. The verification server 140 may interact with another party, such as a trusted seal issuer, in order to obtain the result it provides to the requestor.

Trusted seal issuers provide public verification servers 140 at published uniform resource locators (URLs) that can be used to verify that a trusted seal was legitimately issued to a website. For example, the public URL for verifying a VERISIGN trusted seal used by a website is "https://trustsealinfo.verisign.com/splash?form_file=fdf/splash.fdf&dn=<website>&lang=en", where the "dn=<website>" value pair identifies the domain name of the website to be verified by VERISIGN, and the "lang=en" value pair specifies the language (e.g., English) used by the seal. The public URL to verify a trusted seal issued by THAWTE is "https://sealinfor.thawte.com/thawtespalsh?form_file=fdf/thawtesplash.fdf&dn=<website>&lang=en." In one embodiment, the client security module 112 uses the URL to access the verification server 140 to perform the seal verification. In another embodiment, the security module 112 accesses the verification server 140 at another location, and the verification server 140 uses the public URL of the issuer to verify the seal.

Additionally, the verification server 140 can provide other security information related to the website displaying the seal. For example, for a website certified by the trusted seal issuer, the verification server 140 can provide security information indicating the type of trusted seal issued to the website, the status of the trusted seal, and/or a description of data encryption used by the website.

The network 120 enables communications among the clients 110, the security server 130 and the verification server 140 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
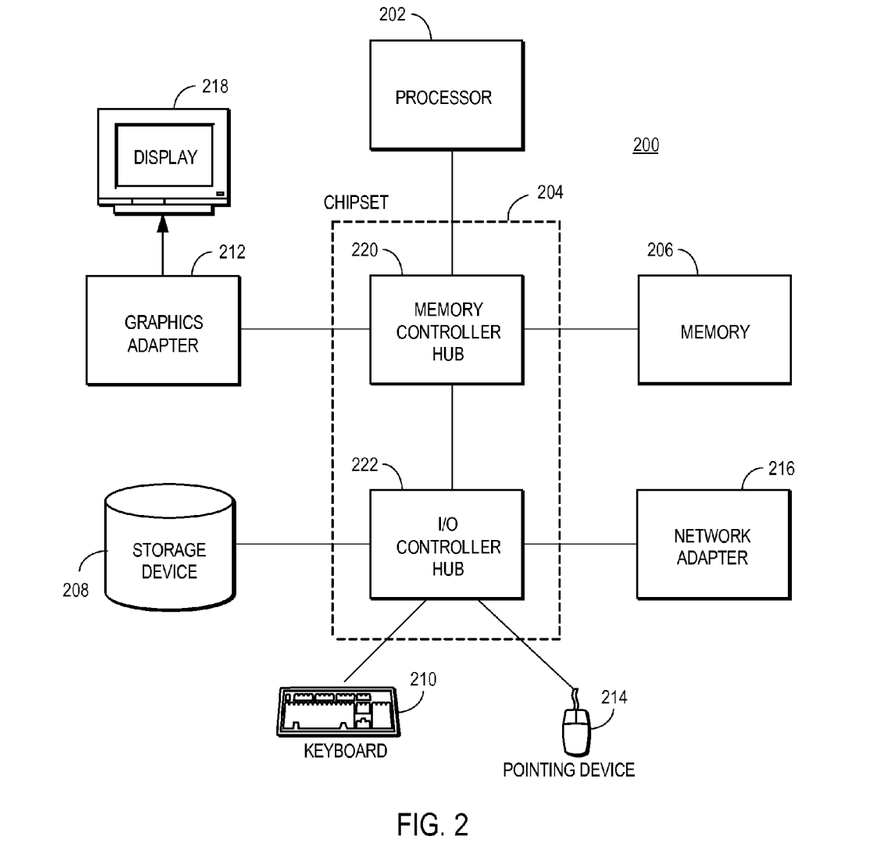
FIG. 2 is a high-level block diagram illustrating a typical computer for use as a security server or a client.

FIG. 2 is a high-level block diagram of a computer 200 for acting as a client 110, security server 130, and/or verification server 140. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a security server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
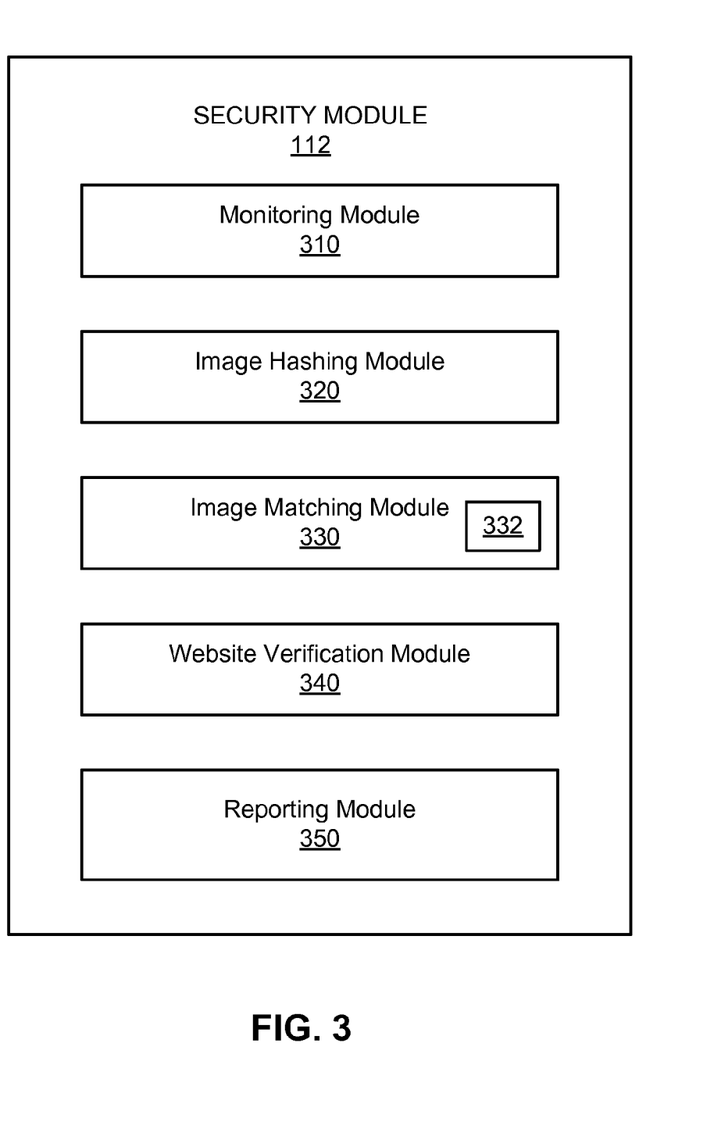
FIG. 3 is a high-level block diagram illustrating a detailed view of a security module of a client according to one embodiment.

FIG. 3 is a high-level block diagram illustrating a detailed view of a security module 112 of a client 110 according to one embodiment. In some embodiments, the security module 112 is incorporated into an operating system executing on the client 110 while in other embodiments the security module 112 is a standalone application or part of another product. As shown in FIG. 3, the security module 112 includes a monitoring module 310, an image hashing module 320, an image matching module 330, a website verification module 240 and a reporting module 350. Those of skill in the art will recognize that other embodiments of the security module 112 can have different and/or other modules than the ones described here, and that the functionalities can be distributed among the modules in a different manner.

The monitoring module 310 monitors websites visited by the client 110 and determines whether to further verify the visited websites based on the sites' reputations. The monitoring module 310 can monitor websites visited by the client 110 using a variety of different techniques. In one embodiment, the monitoring module 310 interacts with a web browser executing on the client 110 to detect and access web pages retrieved by the browser. In another embodiment, the monitoring module 310 monitors traffic between the client 110 and the network 120 to identify website-related traffic, such as HTTP requests and responses.

When the monitoring module 310 detects a website visited by the client 110, the monitoring module 310 interacts with the security server 130 to evaluate the visited website. In one embodiment, the monitoring module 310 sends the domain name of the website visited by the client 110 to the security server 130 and requests the reputation of the website. The monitoring module 310 receives the reputation from the security server 130. In one embodiment, the reputation is represented as a score, such as a value between zero and one. The monitoring module 310 applies a threshold to the score to distinguish between a good reputation and a bad reputation. If the website has a good reputation, the monitoring module 310 determines that the website is likely not misusing trusted seals and therefore continues to monitor other websites visited by the client 110. If the website has a bad reputation, the monitoring module 310 determines that the website might misuse trusted seals and interacts with the image hashing module 320 for further investigation.

The image hashing module 320 generates perceptual hashes of selected images in websites visited by the client 110. A perceptual hash of an image is a fingerprint of the image derived from the content features of the image. Traditional cryptographic hash functions are sensitive to the bit variation of input data being hashed. For example, even one bit change in the input data will change the output hash value dramatically. Unlike the traditional cryptographic hash functions, perceptual hashes of images with similar content features are "close" to each other. The perceptual hash values of content-similar images are invariant under changes to the images that are perceptually insignificant.

The image hashing module 320 can use a variety of content features to generate a perceptual hash value of an image. In one embodiment, the image hashing module 320 generates the perceptual hash value based on geometry preserving feature points in the image. Other embodiments may use other image content features (e.g., gray information of a block of the image, statistics of discrete wavelet transform coefficients of the image) to generate the perceptual hash values.

To reduce the computation load on the client 110, the image hashing module 320 generates hash values for only a selected subset of images in a website. Because the images of trusted seals generally have known dimensions (e.g., x by y pixels), one embodiment of the image hashing module 320 select for hashing only images that have dimensions similar to those of known trusted seals. Some websites embed the image of a trusted seal within a larger image. In one embodiment, the image hashing module 320 detects when a website displays a larger image containing multiple smaller sized images and extracts the smaller sized images. Any image processing scheme for image detection and segmentation known to those of ordinary skill in the art can be used by the image hashing module 320 to extract an image for hashing. To further reduce the computation load, an embodiment of the image hashing module 320 hashes only images found on the first web page (also called the "home page" or "main page") of a website. Websites normally display important information, such as the trusted seal, on their first page, and thus the seal is more likely to be on the first page than on other pages. Other embodiments of the image hashing module 320 select other images for hashing, such as images on pages where personally-identifiable information is collected, or images that have dimensions different from those of known trusted seals.

In addition, some websites embed images as part of FLASH content. In one embodiment, the image hashing module 320 detects when a website uses FLASH to display an image and extracts the image for hashing. The image hashing module 320 can likewise extract images from other data provided by websites.

The image matching module 330 interacts with the image hashing module 320 to determine whether an image found on a website visited by a client 110 matches the image of a trusted seal. In particular, an embodiment of the image matching module 330 determines whether the perceptual hash of the image from the website matches a perceptual hash of a known trusted seal.

In one embodiment, the image matching module 330 includes a local storage 332 that stores seal definitions describing known trusted seals. The definition for a trusted seal can include the perceptual hash value of the trusted seal, the image of the trusted seal, the dimensions of the image, and/or the URL of the verification server 140 for the issuer of the trusted seal. The definitions can also describe localized variations of the trusted seals, such as variations of the seals in different languages and/or for different geographic areas. In one embodiment, the seal definitions in the local storage 332 are used by the image hashing module 320 to select the website images to hash.

For clarity, this description refers to the image from the website visited by the client 110 as the "probe image" and the image of a known trusted seal as the "target image." In operation, the image matching module 330 receives the perceptual hash value of a probe image from the image hashing module 320 and compares this value with the perceptual hashes of target images in the seal definitions. For a (probe image, target image pair), the image matching module 330 measures the perceptual distance between the probe image and the target image in terms of the Hamming distance of the perceptual hash values of the two images. If the Hamming distance of the two images is below a threshold value, the image matching module 330 determines that the probe image matches the target image. Hence, the image from the website is a known trusted seal. Other embodiments may use other means to measure the perceptual distance between two images based on their perceptual hash values.

If the image matching module 330 matches a website image with a known trusted seal, the website verification module 340 determines the URL of the verification server 140 from the seal definition associated with the matching seal. The website verification module 340 then communicates with the verification server 140 to determine whether the website is authorized to display the seal.

The reporting module 350 reports the response of the verification server 140 to the user and/or other modules on the client 110. The reporting can take different forms in different embodiments. In one embodiment, if the verification server 140 indicates that the website is not authorized to display the seal, the reporting module 350 notifies the user by performing a reporting action such displaying a graphical icon, playing a sound indicating that the website is misusing the seal, and/or blocking the submission of personally-identifiable information to the website. If the website is authorized to display the seal, the reporting module 350 can similarly display an icon or play a sound indicating that the website is so authorized. The reporting module 350 can also report additional information, such as the reputation of the website received from the security server 130.

Figure 4:
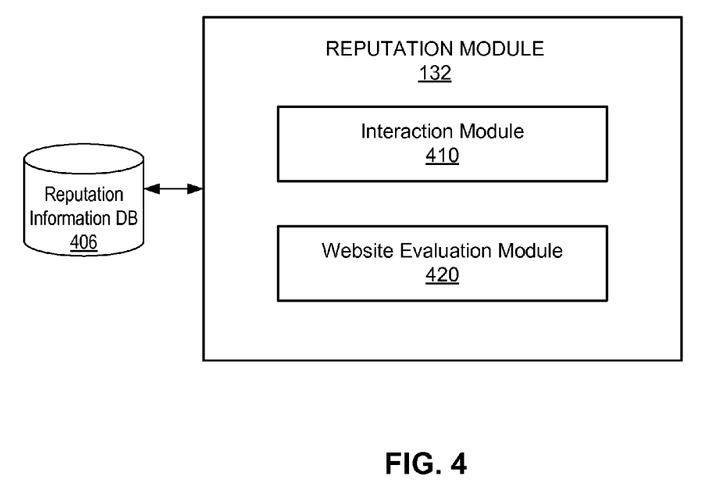
FIG. 4 is a high-level block diagram illustrating a detailed view of a reputation module of a security server according to one embodiment.

FIG. 4 is a high-level block diagram illustrating a detailed view of a reputation module 132 of the security server 130 according to one embodiment. The reputation module 132 receives requests for the reputations of websites from clients 110 and provides responses to the requests with the requested reputations. As shown in FIG. 4, the reputation module 132 includes an interaction module 410 and a website evaluation module 420. Additionally, the reputation module 132 stores and/or retrieves data from a reputation information database 406.

The interaction module 410 receives a request for the reputation of a website from a client 110 and interacts with the website evaluation module 420 to obtain the requested reputation. Upon receiving the requested reputation from the website evaluation module 420, the interaction module 410 transmits the reputation of the website to the client 110.

The website evaluation module 420 receives and maintains information about websites and evaluates this information to determine the reputations of the websites. The website evaluation module 420 can evaluate a variety of information to determine the reputation of a website. In one embodiment, the website evaluation module 420 maintains a whitelist of known legitimate websites. If a website is on the whitelist, the website evaluation module 420 determines that the website has a good reputation (i.e., is trustworthy). The website evaluation module 420 can also maintain a blacklist of known malicious or untrustworthy websites. For example, the blacklist can identify websites that have misused trusted seals or distributed malware in the past. If a website is on the blacklist, the website evaluation module 420 assigns a bad reputation to the website.

Other embodiments of the website evaluation module 420 may use other information to determine the reputation of a website. For example, a website signed with security certificates, e.g., an Extended Validation Certificate, can be deemed to have a good reputation. Similarly, a website that is known to not request personally-identifiable information from its users can be considered to have a good reputation. The website evaluation module 420 can combine one or more evaluation criteria described above for the reputation determination.

The reputation information database 406 stores reputation information used by the website evaluation module 420. The reputation information can include information provided by the clients 110, by the entity that operates the security server 130, and/or by other sources. The reputation information can describe characteristics of websites and include, for example, information indicating a number trusted seal misuse detections for a website, frequencies at which malicious files are downloaded from a website, and information regarding any known degradations to system performance associated with a file downloaded from a website. Other embodiments of the reputation information database 406 store different and/or additional reputation information.

Those of skill in the art will recognize that other embodiments of the reputation module 132 can have different and/or other modules than the ones described here, and that the functionalities can be distributed among the modules in a different manner. For example, in one embodiment, the reputation module 132 performs the hashing and comparison functions ascribed herein to the client security module 112. The reputation module 132 can receive website images and/or hash values from the security module 112 and compare the images to target images maintained in seal definitions stored in the reputation information database 406 or elsewhere. Likewise, the reputation module 132 can contact the verification server 140 if it detects matching images, and report the result of the verification to the client 110.

Figure 5:
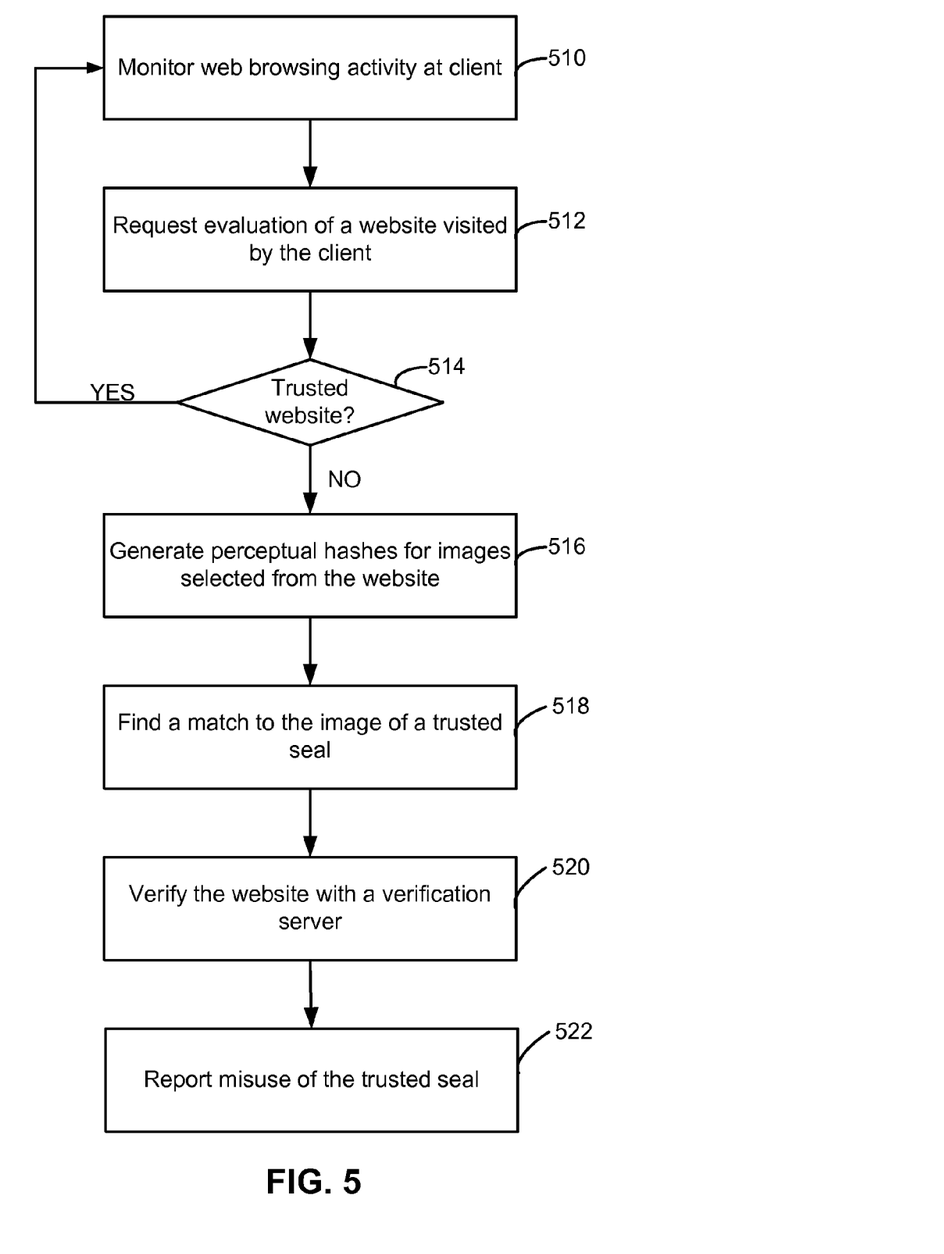
FIG. 5 is a flowchart illustrating steps performed by the security module according to one embodiment.

FIG. 5 is a flowchart illustrating steps performed by the security module 112 to detect a website that misuses a trusted seal according to one embodiment. Other embodiments perform the illustrated steps in different orders, and/or perform different or additional steps. Moreover, some of the steps can be performed by engines or modules other than the security module 112. For example, the steps of verifying whether a website is authorized to use a trusted seal can be performed by the reputation module 132 of the security server 130.

Initially, the security module 112 monitors 510 web browsing activities at the client 110. For example, the security module 112 identifies the websites visited by the client 110. Upon detecting a website visited by the client 110, the security module 112 interacts with the security server 130 and requests 512 evaluation of the website visited by the client 110. The security server 130 replies with a reputation score indicating whether the website is trustworthy. If 514 the website is trustworthy, the security module 112 continues to monitor web browsing activity at the client 110.

If 514 the website is not trustworthy, the security module 112 determines whether the website is misusing a trusted seal. In one embodiment, the security module 112 computes 516 perceptual hashes of selected images in the website, such as images having dimensions similar to those of known trusted seals. The security module 112 compares the perceptual hash values of the website images with perceptual hash values of known trusted seals. If the security module 112 finds 518 a match between a website image and an image of a trusted seal, the security module 112 contacts a verification server 140 associated with the seal to verify 520 that the website is authorized to use the trusted seal. If the website is not authorized to use the seal, the security module 112 reports 522 that the website is misusing the trusted seal.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of detecting misuse of a trusted seal by a website having a plurality of images on a plurality of web pages, the method comprising:
   identifying a subset of pages of the plurality of web pages of the website that collect personally-identifiable information;
   detecting a plurality of images contained in the identified subset of pages that collect personally-identifiable information;
   responsive to detecting that a page in the identified subset collects personally-identifiable information, determining whether spatial dimensions of images contained in the page of the website are similar to spatial dimensions of images of trusted seals issued by known trusted parties to websites certified as using appropriate security procedures;

selecting at least one image of the website for comparison responsive to spatial dimensions of the selected image being similar to spatial dimensions of an image of a trusted seal;

comparing the selected image of the website to the image of the trusted seal;

responsive to the comparison indicating that the selected image of the website matches the image of the trusted seal, verifying that the website is authorized to use the trusted seal; and responsive to the verification indicating that the website is not authorized to use the trusted seal, reporting that the website is misusing the trusted seal.

2. The method of claim 1, further comprising:

determining a reputation associated with the website, the reputation indicating the trustworthiness of the website;

wherein the determining, selecting, comparing, verifying, and reporting steps are performed responsive to the reputation indicating that the website is untrustworthy.

3. The method of claim 2, wherein determining the reputation associated with the website comprises:

providing an identifier of the website to a security server, the security server adapted to provide the reputation of the website responsive to receiving the identifier.

4. The method of claim 1, wherein the comparing comprises:

generating a perceptual hash value of the selected image of the website;

comparing the perceptual hash value of the selected image with a perceptual hash value generated from the image of the trusted seal to determine a perceptual distance between the selected image and the image of the trusted seal; and determining that the selected image of the website matches the image of the trusted seal responsive to the perceptual distance.

5. The method of claim 4, wherein determining the perceptual distance between the selected image and the image of the trusted seal comprises:

calculating a Hamming distance between the perceptual hash value of the selected image and the perceptual hash value of the image of the trusted seal.

6. The method of claim 1, wherein verifying that the website is authorized to use the trusted seal comprises:

providing an identifier of the website to a verification server, the verification server using the identifier to determine whether the website is authorized to use the trusted seal.

7. A non-transitory computer-readable storage medium storing executable computer program instructions for detecting misuse of a trusted seal by a website having a plurality of images on a plurality of web pages, the computer program instructions comprising instructions for:

identifying a subset of pages of the plurality of web pages of the website that collect personally-identifiable information;

detecting a plurality of images contained in the identified subset of pages that collect personally-identifiable information;

responsive to detecting that a page in the identified subset collects personally-identifiable information, determining whether spatial dimensions of images contained in the page of the website are similar to spatial dimensions of images of trusted seals issued by known trusted parties to websites certified as using appropriate security procedures;

selecting at least one image of the website for comparison responsive to spatial dimensions of the selected image being similar to spatial dimensions of an image of a trusted seal;

comparing the selected image to the image of the trusted seal;

responsive to the comparison indicating that the selected image of the website matches the image of the trusted seal, verifying that the website is authorized to use the trusted seal; and responsive to the verification indicating that the website is not authorized to use the trusted seal, reporting that the website is misusing the trusted seal.

8. The computer-readable storage medium of claim 7, further comprising instructions for:

determining a reputation associated with the website, the reputation indicating the trustworthiness of the website;

wherein the determining, selecting, comparing, verifying, and reporting steps are performed responsive to the reputation indicating that the website is untrustworthy.

9. The computer-readable storage medium of claim 8, wherein the computer program instructions for determining the reputation associated with the website further comprise instructions for:

providing an identifier of the website to a security server, the security server adapted to provide the reputation of the website responsive to receiving the identifier.

10. The computer-readable storage medium of claim 7, wherein the computer program instructions for comparing further comprise instructions for:

generating a perceptual hash value of the selected image of the website;

comparing the perceptual hash value of the selected image with a perceptual hash value generated from the image of the trusted seal to determine a perceptual distance between the selected image and the image of the trusted seal; and determining that the selected image of the website matches the image of the trusted seal responsive to the perceptual distance.

11. The computer-readable storage medium of claim 10, wherein the computer program instructions for determining the perceptual distance between the selected image and the image of the trusted seal further comprise instructions for:

calculating a Hamming distance between the perceptual hash value of the selected image and the perceptual hash value of the image of the trusted seal.

12. The computer-readable storage medium of claim 7, wherein the computer program instructions for verifying that the website is authorized to use the trusted seal further comprise instructions for:

providing an identifier of the website to a verification server, the verification server using the identifier to determine whether the website is authorized to use the trusted seal.

13. A system for detecting misuse of a trusted seal by a website having a plurality of images on a plurality of web pages comprising:

a non-transitory computer-readable storage medium storing executable computer program modules comprising:

an image hashing module for:

identifying a subset of pages of the plurality of web pages of the website that collect personally-identifiable information;

detecting a plurality of images contained in the identified subset of pages that collect personally-identifiable information;

responsive to detecting that a page in the identified subset collects personally-identifiable information, determining whether spatial dimensions of images contained in the page are similar to spatial dimensions of images of trusted seals issued by known trusted parties to websites certified as using appropriate security procedures;

selecting at least one image of the website for comparison responsive to spatial dimensions of the selected image being similar to spatial dimensions of an image of a trusted seal; and comparing the selected image of the website to the image of the trusted seal;

a website verification module for, responsive to the comparison indicating that the selected image of the website matches the image of the trusted seal, verifying that the website is authorized to use the trusted seal; and a reporting module for, responsive to the verification indicating that the website is not authorized to use the trusted seal, reporting that the website is misusing the trusted seal; and a processor for executing the computer program modules.

14. The system of claim 13, further comprising a monitoring module for:

determining a reputation associated with the website, the reputation indicating the trustworthiness of the website;

wherein the determining, selecting, comparing, verifying, and reporting steps are performed responsive to the reputation indicating that the website is untrustworthy.

15. The system of claim 13, further comprising an image matching module for:

generating a perceptual hash value of the selected image of the website;

comparing the perceptual hash value of the selected image with a perceptual hash value generated from the image of the trusted seal to determine a perceptual distance between the selected image and the image of the trusted seal; and determining that the selected image of the website matches the image of the trusted seal responsive to the perceptual distance.

16. The system of claim 15, wherein the image matching module is further for:

calculating a Hamming distance between the perceptual hash value of the selected image and the perceptual hash value of the image of the trusted seal.

17. The system of claim 13, wherein the website verification module is further for:

providing an identifier of the website to a verification server, the verification server using the identifier to determine whether the website is authorized to use the trusted seal.

18. The method of claim 1, further comprising:

detecting that a larger image of the website contains a plurality of smaller images; and extracting the plurality of smaller images from the larger image;

wherein the determining determines whether spatial dimensions of the plurality of extracted smaller images are similar to dimensions of known trusted seals.

19. The method of claim 1, further comprising:

identifying a home page of the plurality of pages of the website; and detecting a plurality of images contained in the home page of the website;

wherein the determining determines whether spatial dimensions of only the plurality of images contained in the home page of the website are similar to spatial dimensions of images of trusted seals.

* * * * *